June 10, 1947.  R. B. ROBERTS  2,422,042
GAUGING AND BENDING TOOL FOR ROTOR BLADES
Filed April 17, 1945
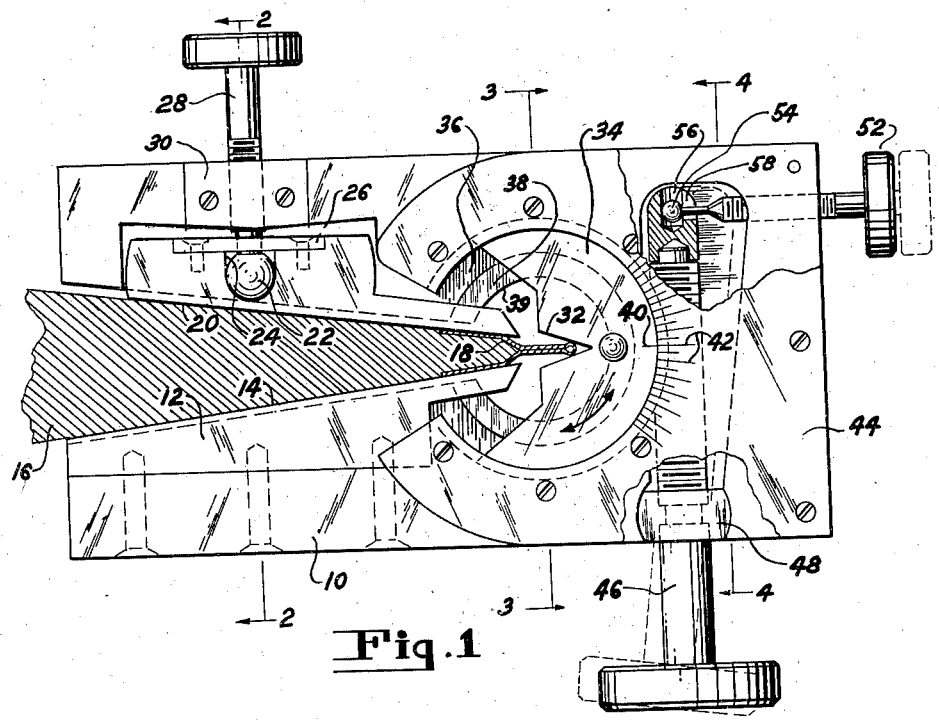
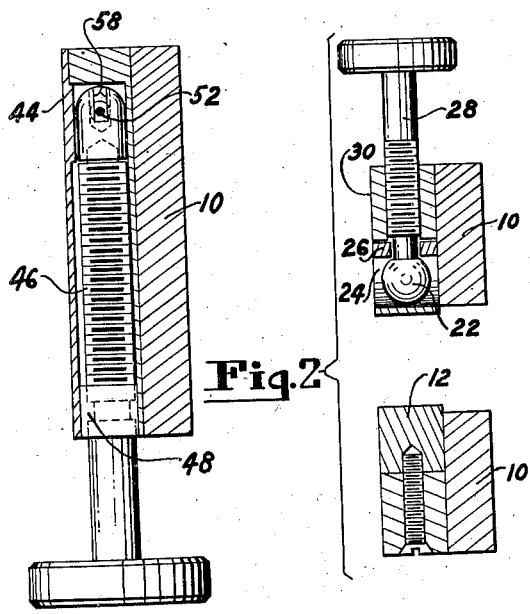
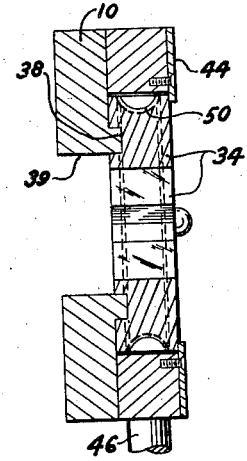
REON B. ROBERTS
INVENTOR
BY *Gifford S. Holmes*
AGENT Patented June 10, 1947

2,422,042

UNITED STATES PATENT OFFICE 2,422,042

GAUGING AND BENDING TOOL FOR ROTOR BLADES

Reon B. Roberts, Fairfield, Conn., assignor to United Aircraft Corporation, East Hartford, Conn., a corporation of Delaware Application April 17, 1945, Serial No. 588,816

3 Claims. (Cl. 153—6)

The present invention relates to measuring and adjusting tools and more particularly to such a tool for changing the dynamic characteristics of a rotor blade for helicopters, and other aircraft parts.

In the fabrication and matching of helicopter blades, it is essential that the several blades of a set comprising the rotor be as carefully matched as possible to insure similar actions for each under all conditions. If the blades are not well matched, different lifts, drags, and pitching moments will result to cause vibrations that will make the operation of the helicopter unsatisfactory.

Heretofore, in testing and adjusting the several blades in a set, measurements by trial and error methods have been taken of the action of the blades in operation and "out of track" blades either replaced or rebuilt to obtain an approximately matched set. In other instances, parts of the blades have been bent by means of a bucking iron and mallet to change the characteristics of the blade. In either case, the methods are of the "cut and try" kind and matching of the blades is rendered tedious, expensive, and in some cases injury to the trailing edge has occurred when the mallet and bucking iron was used.

It is an object of the present invention to provide a tool for accurately and readily matching a rotor blade, or the like, to other rotor blades.

Another object is to provide such a tool that may be used to measure, adjust, match and predetermine the action of the blades before and/or after they have reached a final stage in fabrication.

Another object in connection with the preceding objects is to provide a tool that will not stress any part of the blade excessively.

Another object is to provide a tool that can be stored in the aircraft so that corrections and adjustments may be made when the operator is without benefit of hangar service, or the like.

The foregoing and other objects will be either obvious or pointed out in the specification and claims.

In the drawing:

Fig. 1 is an elevational view of my invention shown in place upon the trailing edge of a rotor blade, or the like;

Fig. 2 is a section taken along the lines 2—2 of Fig. 1;

Fig. 3 is a section taken along the line 3—3 of Fig. 1; and

Fig. 4 is a section taken along the line 4—4 of Fig. 1.

In the description to follow, the different parts will be described as being made up of given shapes and having characteristics attendant such shaping. However, it is to be understood that the different parts of the invention could be formed and assembled differently than shown without departing from the spirit of the invention. Hence, I wish not to be limited in my invention to the specific structure to be described hereinafter by way of example.

The tab bending tool is made up within a generally U-shaped base 10, which is cut out in places to receive operating parts to be described below. The base 10 supports, on one of the legs of the base, a block 12 having a surface 14 for engaging the surface of a rib 16 having a trailing edge tab 18. The surface 14 is shaped to fit the part to be formed and is not necessarily straight as indicated in Fig. 1. A movable surface 20 is swivelly mounted upon a ball 22 that rests in a curved bottomed slot 24, and is held in place by a retainer bar 26. The ball 22 can be the head of a screw which is fitted into a set screw 28 that is threaded into a plug 30 recessed in the upper leg of the U-shaped base 10. The set screw 28 may be screwed in and out to cause the surface 20 to engage or disengage the upper surface of the rib 16 to cause it to be clamped between the surfaces 20 and 14 respectively.

The clip 18 on the trailing edge of the rib 16 is engaged by a V notch 32 in a rotatable member 34. The member 34 is set in a circular recess 36 in the U-shaped member 10. An annular shoulder 38 formed as a lip of a hole 39 in the base 10 engages a cooperative annular groove in the member 34 so that the member 34 can rotate upon the annular shoulder 38 but is held against transverse movements. The rotatable member 34 has a mark 40 cooperable with indicia 42 carried by a retaining cover 44 that is bolted to the base member 10 to hold the rotatable member 34, and other parts to be described later, in place.

The rotatable member 34 can be rotated by a hand screw 46 carried upon a swivel 48 in the base 10. The sides of the swivel 48 are flat in the front and back as viewed in Fig. 1 and curved at the sides so that the screw 46 can rotate to the right or left. In the position shown, when the screw 46 is rotated, it will mesh with teeth 50 on the periphery of the rotatable member 34 to cause it to rotate about its center and bend the tab 18 of the rib 16. The gear transmission resulting from the engagement of screw 46 and teeth 50 provides a convenient reduction gearing and vernier adjustment of the rotatable member 34. The screw 46 can be moved into and out of engagement with the threads 50 by a hand screw 52 which fits into the right side of the base 10 and has a ball end 54 in a hole 56 with confining slots 58 for pushing or pulling the upper end of the screw 46 to the left or to the right. In the right hand position, shown in dotted lines, the screw 46 will disengage the threads 50 on the rotatable member 34 and in the position shown in full lines, the threads will be engaged.

In using the present device, the screw 46 is placed in the dotted line position so that the threads 50 will be disengaged. The entire member is then placed onto the rib 16 until the V notch 32 engages the trailing edge clip 18. The hand nut 28 is screwed down so that the surfaces 20 and 14 clamp the rib 16 in place. The operator will then compare the position of the mark 40 with indicia 42 and note the position of the tab 18. If the indicia register a position away from that desired, the hand screw is operated to cause the threads of the screw 46 to engage the threads 50 of the rotatable member 34. The screw 46 is then rotated in a direction to cause the V notch 32 to bend the tab 18 in the desired direction to correct the error shown by the indicia. Thereafter, the threads on the screw 46 and the rotatable member 34 can be disengaged by operating the hand screw 52 from the full line position shown to the dotted line position and a second reading taken. With some practice on the part of an operator, the proper adjustment of the tab 18 can be made in one operation usually, and with two or three operations for the most difficult circumstances when, in the manufacture of the blade, the errors due to accumulated tolerances are greatest.

By using the present device, it is possible to take readings at different ribs on one rotor blade of a helicopter, for example, and use such data as a reference to adjust the other blades to conform with the one blade. It is also possible with the present invention to inspect and adjust completed blades so that they all substantially conform to a desired standard. It is further possible with the present invention to quickly and accurately take readings and adjust a blade once it has been installed upon aircraft. Any of such adjustments can be made without injuring the blade parts. Further, although one type of metal clip has been shown in detail herein, other types have likewise been successfully adjusted without injury. The style or type of clip used does not limit the use of the tool.

While I have shown and described the present invention in connection with means for adjusting the trim tabs on the trailing edges of helicopter rottor blades, it will be clear that the above invention could also be used for adjusting the trailing edge parts of other type aircraft, and for adjusting similar devices such as fan blades, and the like. For these reasons, I desire not to be limited in my invention only to that form shown and described but by the scope of the claims.

I claim:

1. A tool for measuring and adjusting the position of the trailing edge of an airfoil section with respect to a support thereof comprising in combination, a generally U-shaped base member having a surface on one leg of the member for engaging said support, a movable clamping surface opposed to the engaging surface and mounted upon the opposite leg of the member, means rotatably mounted between the legs of said base member including sides forming a notch for engaging the trailing edge, means for measuring the position of said rotatable means with respect to said base member, means including a gear reduction means for rotating said rotatable means to adjust the shape of the trailing edge, and means for disabling said gear means.

2. A tool for measuring and adjusting the position of the trailing edge of an airfoil section with respect to a support thereof comprising in combination, a generally U-shaped base member having a surface on one leg of the member for engaging said support, a movable clamping surface opposed to the engaging surface and mounted upon the opposite leg of the member, means rotatably mounted between the legs of said base member including sides forming a notch for engaging the trailing edge, means for measuring the position of said rotatable means with respect to said base member, and means for rotating said rotatable means to adjust the shape of the trailing edge.

3. A tool for measuring and adjusting the position of the trailing edge of an airfoil section with respect to a support thereof comprising in combination, a generally U-shaped base member having a surface on one leg of the member for engaging said support, a movable clamping surface opposed to the engaging surface and mounted upon the opposite leg of the member, means rotatably mounted between the legs of said base member including sides forming a notch for engaging the trailing edge, and means for adjusting the position of said rotatable means with respect to said member when the trailing edge is engaged by the notch.

REON B. ROBERTS.

REFERENCES CITED

The following references are of record in the file of this patent:

UNITED STATES PATENTS

| Number | Name | Date |
| --- | --- | --- |
| 142,018 | Holmes | Aug. 19, 1873 |
| 540,513 | Polyblank | June 4, 1895 |
| 1,120,630 | Schaffer | Dec. 8, 1914 |
| 2,041,365 | Mitchell et al. | May 19, 1936 |
| 1,783,177 | Luce | Dec. 2, 1930 |
| 1,754,470 | Kerlin | Apr. 15, 1930 |
| 2,364,989 | Mallina | Dec. 12, 1944 |